Oct. 7, 1958

G. C. HUGHES 2,854,996

FLUID PRESSURE RELIEF VALVE

Filed April 12, 1956

INVENTOR.
GEORGE C. HUGHES
BY
Bates, Teare & McDean
ATTORNEYS

United States Patent Office 2,854,996
Patented Oct. 7, 1958

2,854,996

FLUID PRESSURE RELIEF VALVE

George C. Hughes, Anderson, Ind., assignor to Reynolds Gas Regulator Company, Anderson, Ind., a corporation of Indiana Application April 12, 1956, Serial No. 577,779

10 Claims. (Cl. 137—484.2)

This invention is concerned with improvements in or relating to fluid pressure relief valves, and particularly to relief valves for use in the distribution of natural and similar gases. This therefore is the general object of the present invention.

The invention provides a relief valve including a housing which is divided into two chambers by a flexible diaphragm, one chamber being connected by a suitable conduit with a source of fluid pressure which is to be maintained below a predetermined maximum, and the other of which is connected to atmosphere by a suitable vent or conduit. The diaphragm is provided with an opening which extends therethrough, and is biased against a fixed closure member by a counterweight or spring associated with a supporting member carried by the diaphragm. A predetermined increase of pressure in the supply increases the pressure in the pressure chamber and moves the diaphragm away from its closure member against the action of the biasing counterweight or spring thereby permitting the escape of such pressure through said diaphragm opening into the vent chamber and out of the valve through the vent.

A feature of the invention is the provision of means to maintain the pressure on the atmospheric side of the diaphragm at or below atmospheric pressure consequent upon movement of the diaphragm to its pressure relieving position in which gas flows through the diaphragm from the source and even though the relief valve is used in connection with a source having relatively high pressure and flow components. These therefore are the more specific objects of the invention.

Figure 1:
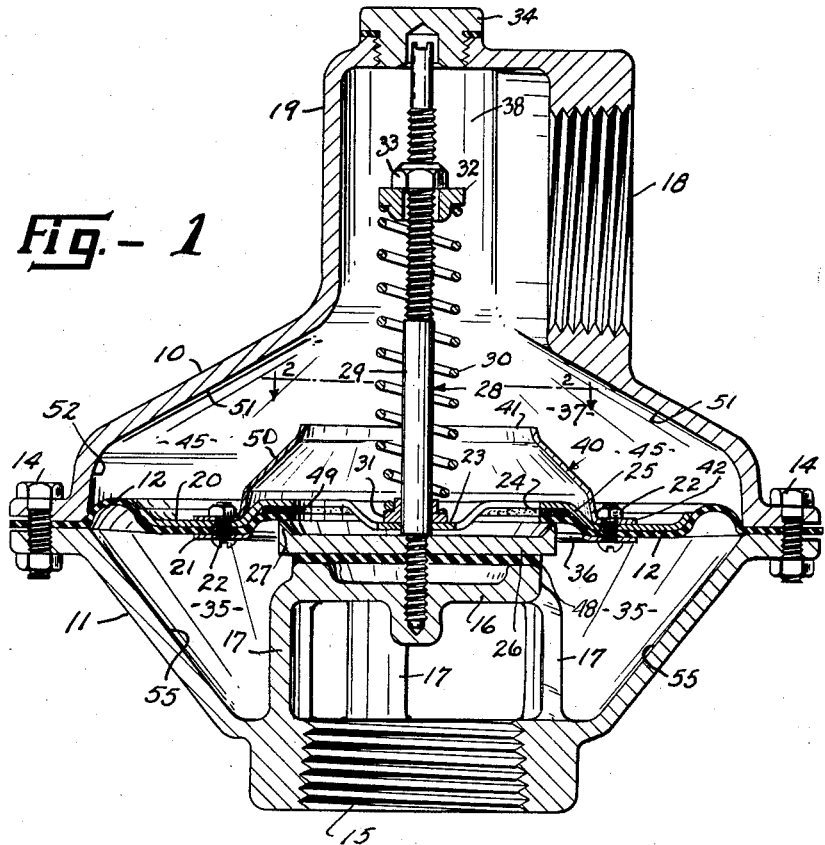
Figure 2:
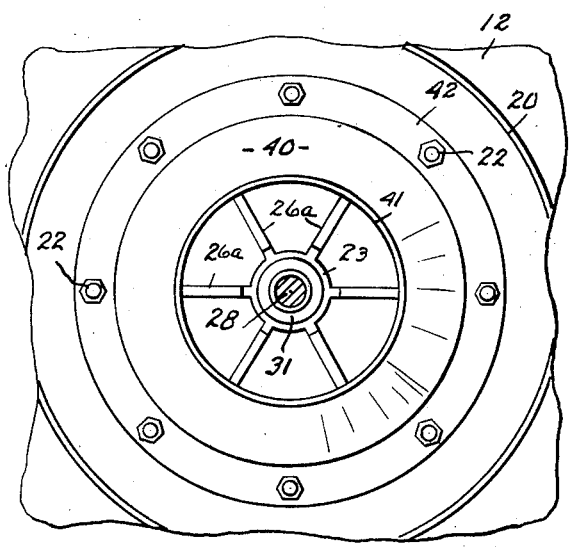

Other objects and advantages of the invention will become apparent from the following description of a practical embodiment of the invention, reference being had to the accompanying drawing in which:

Fig. 1 is a centrally located vertical section taken through one embodiment of the invention; and Fig. 2 is a fragmentary horizontal section, the plane of which is indicated by the line 2—2 on Fig. 1.

As illustrated in the drawings, the improved pressure relief valve includes an upper housing member 10 and a lower housing member 11 between which a flexible pressure responsive diaphragm 12 extends. The housing members comprise substantially hollow truncated cones, the lower member 11 being inverted, and the diaphragm 12 being clamped between the larger ends of both members, as by bolts 14.

The bottom of the lower housing member 11 has a threaded inlet opening 15 to receive a conduit connecting it with a fluid pressure source, as for instance a gas distribution line (not illustrated). A horizontal platform 16 of a diameter substantially equal to that of the inlet opening 15 is centrally positioned in the housing member 11 adjacent its upper end. This platform forms an integral part of the housing, being connected thereto by spaced supporting arms or webs 17.

The upper housing member 10 terminates in an upwardly extending hollow cylinder boss 19 having a threaded vent, or outlet opening 18 in its side wall. The internal diameter of the boss 19 and that of the vent 18 are, for practical purposes, substantially the same as that of the inlet opening 15 of the lower housing member 11.

The diaphragm 12 comprises a circular sheet of flexible rubber-like material reinforced to eliminate any substantial stretching. The diaphragm is resilient only to a minor degree. Materials used in the manufacture of such diaphragm are well known in the art at the present time. The diaphragm is clamped between a pair of thin metallic reinforcing plates 20 and 21 by bolts 22. These plates are smaller in diameter than the housing members to permit the diaphragm to move up and down in the housing in the customary manner.

The diaphragm 12 and its reinforcing or supporting plates 20 are provided with centrally located and aligned openings 24, the cross-sectional diameter of which is substantially the same as that of the inlet and outlet openings 15 and 18. The lower plate 21 is provided with a central opening 36 which is larger in diameter than the openings 24. The upper diaphragm plate 20 is dished upwardly adjacent its central opening as at 25, and is provided with a central hub portion 23 connected to the dished portion 25 by a series of radially extending spokes 26a.

The opening 24 in the diaphragm is normally closed by a closure plate or disc 26 against which the diaphragm is biased, as will be hereinafter more fully described. This disc is larger in diameter than the openings 24 but smaller than the diameter of either the opening 36 in the lower plate 21 or the diameter of the dished portion 25 of the upper plate. Adjacent its edges, the disc 26 is provided with an upstanding annular rib 27 which engages the under side of the diaphragm 12. The disc 26 is secured to the upper face of the platform 16 by a threaded stem 28 having an intermediate unthreaded or cylindrical portion 29 which passes freely upward into the boss 19 through a suitable guiding opening formed in the upper plate 20. A compressible member 48 is interposed between the platform 16 and the disc 26 to avoid the necessity of accurately machining the coacting surfaces. A resilient ring 49 formed of closed cellular sponge rubber is interposed between that portion of the diaphragm which coacts with the rib 27 of the disc 26 and the upper diaphragm plate 21. The ring 49 is preferably secured in position by cementing it to the plate 20 and/or diaphragm 12. One characteristic of such sponge rubber is that its cells are filled with a gas under pressure, and even though the ring remains compressed by the rib 27 for long periods of time it quickly resumes its natural uncompressed condition when the external pressure is released. This arrangement provides a durable valve seat which is particularly well adapted for use in a relief valve as the valve member might remain seated for protracted periods of time.

The diaphragm 12 is biased against the closure disc 26 by a compression spring 30. This spring encircles the stem 28 with its lower end bearing against the usual locating washer 31 slidably mounted on the stem and resting on the plate 20. The upper end of the spring 30 engages a locating washer 32 which likewise is slidable on the stem 28. Upward movement of the washer 32 is limited by an adjusting nut 33 threadingly mounted on the stem. This arrangement permits adjustment of the downward pressure the spring exerts against the diaphragm to bias the latter to a closed position. Access to the nut 33 is had by removal of a threaded plug 34 which forms a closure for the upper end of the upper housing member 10.

In operation, the biasing spring 30 retains the diaphragm 12 seated against the closure disc 26 as long as the pressure in the source and hence that in the chamber 35 beneath the diaphragm remains below the predetermined maximum for which the diaphragm biasing spring 30 was set. Should however the pressure in the chamber 35 exceed such maximum, the resulting increase in upward pressure against the diaphragm will move it upward against the biasing action and away from the closure disc 26. Accordingly gas will flow from the source through the chamber 35, the opening 24 in the diaphragm assembly 12, 20, the chamber 37 above the diaphragm, the chamber 38 in the boss 19, and will pass out of the valve housing through the vent 18. When the pressure in the supply drops below such maximum the spring 30 will cause the diaphragm to engage the closure disc 26 and thereby stop the flow of gas from the pressure source through the relief valve.

One of the features of the present invention is the means for assuring the above operation when the relief valve is connected with a pressure source having a relatively high pressure and flow components. For this purpose an imperforate frusto conical sleeve 40 is secured to the diaphragm assembly. As shown in the drawings, the base of this sleeve has a diameter slightly larger than that of the dished portion 25 of the upper diaphragm plate 20. The sleeve extends upward above the diaphragm a distance which is at least three tenths that of the diameter of the opening 24 in the diaphragm 12, and terminates in a small cylindrical portion 41 having an internal diameter slightly smaller than that of the opening 24. The lower end of the sleeve 40 is provided with an outwardly extending flange 42, which is secured to the diaphragm assembly, as for instance, by the bolts 22 heretofore described.

When the diaphragm 12 moves upward away from the closure disc 26, in response to an excess pressure at the pressure source, the sleeve 40 acts as a conduit extending from the diaphragm upward into the chamber 37 and directs the flow of gas under pressure from the pressure chamber 35 into the chamber 38 of the boss 19, from which it escapes through the vent opening 18. This eliminates any increase of pressure of the gas in the chamber 37, acting downward on the diaphragm which otherwise might result from gas under pressure entering the chamber 37 and protects against undesired decrease of the pressure differential acting to retain the diaphragm raised.

The sleeve 40 actually causes an increase in the pressure differential tending to raise the diaphragm. The flow of gas from the pressure chamber 35 through the sleeve 40 causes the sleeve to act as a jet drawing gas from the portion 45 of the vent chamber 37 laying between the outer wall of the sleeve and the inner wall or surface of the housing member 10, and eject such gas from the chambers 37 and 38, thus decreasing the pressure above the underlaying portion of the diaphragm 12. This condition is increased by reason of the fact that the area at the open upper end of the chamber portion 45 between the upper end of the sleeve 40 and the inner wall of the housing 10 is much less than that at the lower portion thereof. This is partially due to the fact that the walls of the chamber portion 45 are formed by inverted conical surfaces 50 and 51; partially because of the cylindrical formation 41 at the upper end of the sleeve; and partially because the angle the conical surface 50 forms with its horizontal base is greater than the corresponding angle of the conical surface 51.

It is to be noted that the outer wall of the chamber portion 45 has a substantially cylindrical surface portion 52 adjacent its lower end whereas the cylindrical portion 41 of the sleeve is adjacent its upper end. Accordingly the effective horizontal area at the bottom of the chamber portion is not decreased as the diaphragm rises and the effective area or throat at the upper end of such chamber portion decreases rapidly as the diaphragm rises. This relationship also aids in the reduction of pressure in the chamber portion 45 when the diaphragm rises and its advantages appear obvious.

Once gas starts to flow through the sleeve 40 the impingement of such flowing gas against the inward converging wall of the sleeve actually adds to the upward pressures acting to raise the diaphragm. This effect is increased by reason of the fact that the cross-sectional area of the opening 24 in the diaphragm assembly is greater than the cross sectional area of the upper end of the sleeve.

Decrease in pressure acting on the lower face of the diaphragm 12 due to the flow of gas when the relief valve is opened is prevented by the platform 16 which is positioned in the path of gas flowing into the chamber 35 through the inlet opening 15. This platform diverts the stream of gas outward between the platform supporting arms 17 and along the inverted frusto conical surface 55 of the inner wall of the housing member 11 causing it to impinge on the diaphragm 12. Accordingly the flow of gas from the inlet opening 15 to the diaphragm opening 24 tends to increase rather than decrease the pressure under the diaphragm. This likewise increases the effective pressure differential acting to open the valve once flow through the valve has started, From the foregoing it will be seen that I have provided a fluid pressure relief valve of the flexible diaphragm actuated type which is extremely simple, and which is highly effective under adverse pressure and flow conditions and which may be economically constructed for use where high flow conditions exist.

I claim:

1. A fluid pressure relief valve including a hollow housing, a flexible diaphragm dividing the housing into a pressure chamber and a vent chamber, said pressure chamber having an inlet opening adapted to be connected with a source of fluid pressure which is to be maintained below a predetermined maximum, said vent chamber having a vent opening adapted to communicate with atmosphere, said diaphragm having an opening extending therethrough, closure means for said diaphragm opening positioned within said housing, biasing means acting on said diaphragm to oppose the pressure in the pressure chamber and move the diaphragm into closing position relative to said closure means, and means carried by said diaphragm to maintain pressure in the vent chamber acting on the diaphragm at or below atmospheric pressure consequent upon movement of the diaphragm away from said closure means and the consequent flow of gas under pressure from the atmospheric chamber through the vent chamber to the vent opening, said means comprising an open-ended sleeve encompassing said diaphragm opening on the vent chamber side thereof and extending into said vent chamber, said sleeve having an inner surface converging outwardly from said diaphragm, said surface directing the flow of fluid from said pressure chamber toward said vent opening to thereby increase the pressure differential tending to move said diaphragm away from said closure means.

2. A fluid pressure relief valve including a hollow housing, a flexible pressure responsive diaphragm extending across said housing and dividing it into a pressure chamber and a vent chamber, said housing having an inlet opening communicating with the said vent chamber, said diaphragm having an opening extending therethrough, a stationary closure means mounted in said pressure chamber in alignment with the diaphragm opening, biasing means biasing said diaphragm toward said closure means to seal the pressure chamber from the vent chamber, and a sleeve carried by said diaphragm encircling the opening therein and extending into said vent chamber, said sleeve having a frusto-conical inner surface, the smallest diameter of said surface being spaced farthest from said diaphragm.

3. A fluid pressure relief valve according to claim 2 wherein said sleeve extends upwardly into said vent chamber a distance equal to at least three-tenths the diameter of the diaphragm opening.

4. A fluid pressure relief valve according to claim 2 wherein the housing enclosing said vent chamber is provided with a frusto-conical inner surface in axial alignment with and encircling said sleeve, said surface having its smaller diameter spaced farthest from said diaphragm and so positioned that as the diaphragm moves away from said closure means the upper end of said sleeve approaches said surface.

5. A fluid relief valve according to claim 4 wherein said housing enclosing said vent chamber has a substantially cylindrical surface encircling said sleeve and interposed between the base of said frusto-conical surface and said diaphragm, said cylindrical surface extending upwardly from said diaphragm a distance less than the distance said sleeve projects into said chamber whereby the effective transverse area of the diaphragm subjected to pressure in the vent chamber externally of said sleeve remains constant as the diaphragm moves away from its closure member, and wherein the vent opening is positioned at a point remote from the diaphragm and said surfaces.

6. A gas pressure relief valve including a hollow valve housing, a substantially circular flexible pressure responsive diaphragm extending across said housing and dividing it into a pressure chamber and a vent chamber, said housing having an inlet opening in communication with said pressure chamber and a vent opening in communication with said vent chamber, said diaphragm having a centrally located opening extending therethrough, a stationary valve disc mounted in said pressure chamber in axial alignment with the diaphragm opening and adapted to close such opening, biasing means acting on said diaphragm and urging it into closing contact with said disc, and a frusto-conical sleeve mounted on said diaphragm and extending into the vent chamber, said sleeve being in axial alignment with the diaphragm and having a base encircling the opening therein, said housing enclosing said vent chamber being provided with a frusto-conical inner surface in axial alignment with and encircling said sleeve, said surface having its smaller diameter spaced farthest from said diaphragm and so positioned that as the diaphragm moves away from said disc, the upper end of said sleeve approaches said surface.

7. A fluid relief valve according to claim 6 wherein said housing enclosing said vent chamber has a substantially cylindrical surface encircling said sleeve and interposed between the base of said frusto-conical surface and said diaphragm, said cylindrical surface extending upwardly from said diaphragm a distance less than the distance said sleeve projects into said chamber whereby the effective transverse area of the diaphragm subjected to pressure in the vent chamber externally of said sleeve remains constant as the diaphgram moves away from its closure member, and wherein the vent opening is positioned at a point remote from said diaphragm and said surfaces.

8. A fluid pressure relief valve according to claim 6 wherein said valve disc is positioned above abutment means disposed in the path of gas flowing from the inlet into said pressure chamber, said abutment means directing the stream of gas generally outwardly into impingement against said diaphragm to thereby increase the pressure of the gas on the diaphragm and move the latter away from said valve disc.

9. A gas pressure relief valve including a hollow valve housing, a flexible pressure responsive diaphragm extending across said housing and dividing it into a pressure chamber and a vent chamber, said housing having an inlet opening in communication with said pressure chamber and a vent opening in communication with said vent chamber, said diaphragm having a centrally located opening extending therethrough, a stationary valve disc mounted in said pressure chamber in axial alignment with the diaphragm opening and adapted to close such opening, biasing means acting on said diaphragm and urging it into closing contact with said disc, jet means carried by said diaphragm and extending into the vent chamber and acting to reduce the fluid pressure in the vent chamber acting on the diaphragm consequent upon the flow of gas under pressure through said diaphragm opening, said jet means comprising an open-ended sleeve having a frusto-conical inner surface, the smallest diameter of said surface being spaced farthest from said diaphragm.

10. A fluid pressure relief valve including a hollow housing a flexible fluid responsive diaphragm extending across said housing and dividing it into a lower pressure chamber and an upper vent chamber, said housing having an inlet opening communicating with said pressure chamber and a vent opening communicating with the said vent chamber, said diaphragm having a centrally positioned opening extending therethrough, a stationary closure means mounted in said pressure chamber and in alignment with and interposed between the inlet and diaphragm opening, resilient biasing means biasing said diaphragm toward said closure means to seal the pressure chamber from the vent chamber, and a frusto-conical sleeve carried by said diaphragm encircling the opening and extending upward into said vent chamber, and terminating at its upper end in a cylindrical portion, said vent chamber being provided with a frusto-conical inner surface in axial alignment with and encircling said sleeve, said surface having its smaller diameter spaced farthest from said diaphragm and being so positioned that as the diaphragm moves away from said closure means the upper end of said sleeve approaches said surface, there being a substantially cylindrical surface in said vent chamber encircling said sleeve and interposed between the base of said frusto-conical surface and said diaphragm, said cylindrical surface extending upwardly from said diaphragm a distance less than the distance said sleeve projects into said chamber, whereby the effective transverse area of the diaphragm subjected to pressure in the vent chamber externally of said sleeve remains constant as the diaphragm moves away from its closure member, the upper end of said frusto-conical surface terminating in a hollow cylindrical portion having a diameter substantially equal to that of the upper end of said sleeve and spaced thereabove and from which said vent opening extends.

References Cited in the file of this patent

UNITED STATES PATENTS

| 213,118 | Locke | Mar. 11, 1879 |
| 1,162,731 | Burke | Nov. 30, 1915 |
| 2,671,989 | Schwarz | Mar. 16, 1954 |

FOREIGN PATENTS

| 803,738 | Germany | Apr. 9, 1951 |